(12) United States Patent
Kimura et al.

(10) Patent No.: US 8,497,615 B2
(45) Date of Patent: Jul. 30, 2013

(54) ROTARY ELECTRIC MACHINE

(75) Inventors: Takahiro Kimura, Tokyo (JP);
Kazunori Tanaka, Tokyo (JP);
Yukiyoshi Oonishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 13/212,503

(22) Filed: Aug. 18, 2011

(65) Prior Publication Data

US 2012/0248923 A1    Oct. 4, 2012

(30) Foreign Application Priority Data

Apr. 1, 2011 (JP) ................................. 2011-081885

(51) Int. Cl.
*H02K 1/00* (2006.01)
(52) U.S. Cl.
USPC ............................ 310/198; 310/184; 310/179
(58) Field of Classification Search
USPC ................... 310/179–180, 184, 198
See application file for complete search history.

(56) References Cited

U.S. PATENT DOCUMENTS

| | | | | |
|---|---|---|---|---|
| 6,417,592 B2 * | 7/2002 | Nakamura et al. | ............ | 310/184 |
| 8,076,814 B2 * | 12/2011 | Tupper et al. | ................. | 310/179 |
| 2001/0040416 A1 * | 11/2001 | Nakamura et al. | ............ | 310/201 |
| 2002/0096963 A1 * | 7/2002 | Masegi | .......................... | 310/254 |
| 2002/0180299 A1 * | 12/2002 | Oohashi et al. | ............... | 310/184 |
| 2004/0251766 A1 * | 12/2004 | Kometani et al. | ............. | 310/216 |
| 2005/0242676 A1 * | 11/2005 | Fujikawa | ...................... | 310/179 |
| 2012/0248922 A1 * | 10/2012 | Imazawa et al. | ............... | 310/198 |

FOREIGN PATENT DOCUMENTS

| | | |
|---|---|---|
| JP | 2927288 B2 | 7/1999 |
| JP | 3590623 B2 | 11/2004 |
| WO | 2004/062065 A1 | 7/2004 |

* cited by examiner

*Primary Examiner* — Thanh Lam
(74) *Attorney, Agent, or Firm* — Sughrue Mion, PLLC

(57) ABSTRACT

A stator winding is configured by connecting a first three-phase stator winding and a second three-phase stator winding in parallel. A $U_1$-phase winding of the first three-phase stator winding is configured by connecting a $U_{1\text{-}1}$-phase winding portion and a $U_{1\text{-}2}$-phase winding portion in series, and a $U_2$-phase winding of the second three-phase stator winding is configured by connecting a $U_{2\text{-}1}$-phase winding portion and a $U_{2\text{-}2}$-phase winding portion in series. The $U_{1\text{-}1}$-phase winding portion and the $U_{2\text{-}2}$-phase winding portion are m-turn wave windings, and the $U_{2\text{-}1}$-phase winding portion and the $U_{1\text{-}2}$-phase winding portion are n-turn wave windings (where n does not equal m). The $U_{1\text{-}1}$-phase winding portion and the $U_{2\text{-}1}$-phase winding portion are mounted into a first slot group, and the $U_{1\text{-}2}$-phase winding portion and the $U_{2\text{-}2}$-phase winding portion are mounted into a second slot group.

2 Claims, 4 Drawing Sheets

ROTARY ELECTRIC MACHINE

BACKGROUND OF THE INVENTION

1. Field of the Invention

The present invention relates to a rotary electric machine such as an automotive alternator, and particularly relates to a mounting construction for a stator winding that is wound into a wave winding in a stator core in which slots are formed at a ratio of two slots per phase per pole.

2. Description of the Related Art

In conventional rotary electric machines, a stator winding is configured by wye-connecting a U-phase winding, a V-phase winding, and a W-phase winding in each of which a first winding and a second winding that have a phase difference of 30 electrical degrees from each other are connected in series, and the first winding and the second winding are each configured by connecting a plurality of windings in parallel (see Patent Literature 1, for example).

Patent Literature 1: Japanese Patent Laid-Open No. 2010-136459 (Gazette: FIG. 15)

In conventional rotary electric machines according to Patent Literature 1, because the plurality of windings that constitute the first winding and the second winding are concentrated windings, turn counts of the windings can be changed easily. Thus, problems with cyclic currents in parallel circuit portions can easily be solved by making the turn counts of the plurality of windings that are connected in parallel equal. In order to achieve desired output characteristics, the turn count between the first winding and the second winding that are connected in series must also be changed, but that requirement can be met easily by changing the turn counts of the windings that constitute the first winding and the turn counts of the windings that constitute the second winding.

Even if the plurality of windings that constitute the first winding and the second winding are constituted by wave windings instead of concentrated windings, problems with the generation of cyclic currents in the parallel circuit portions can be solved by making the turn counts of the plurality of windings that are connected in parallel equal, and predetermined output characteristics can be achieved by changing the turn counts between the first winding and the second winding that are connected in series.

Now, let us assume that the first winding is configured by connecting two four-turn wave windings in parallel, and the second winding is configured by connecting two three-turn wave windings in parallel. In that case, eight conductor wires are housed in each of the slots in which the first winding is mounted, and six conductor wires are housed in each of the slots in which the second winding is mounted. Thus, the number of conductor wires that are housed in the slots is different in each slot, and one disadvantage has been that unevenness occurs on the inner circumferential surfaces of the coil end groups of the stator winding, generating loud wind-splitting noise with the rotor.

SUMMARY OF THE INVENTION

The present invention aims to solve the above problems and an object of the present invention is to provide a rotary electric machine in which phase windings are configured by connecting in series two winding portions that have different turn counts to increase output, and in which the formation of unevenness on inner circumferential surfaces of coil end groups is suppressed to enable wind-splitting noise to be reduced.

In order to achieve the above object, according to one aspect of the present invention, there is provided a rotary electric machine including: a rotor that is rotatably supported by a housing; and a stator including: a stator core in which slots are formed at a ratio of two slots per phase per pole; and a first three-phase stator winding and a second three-phase stator winding that are mounted into the stator core, the stator being supported by the housing so as to surround the rotor. The first three-phase stator winding is configured by wye-connecting a $U_1$-phase winding, a $V_1$-phase winding, and a $W_1$-phase winding, and the second three-phase stator winding is configured by wye-connecting a $U_2$-phase winding, a $V_2$-phase winding, and a $W_2$-phase winding. The $U_1$-phase winding is configured by connecting a $U_{1-1}$-phase winding portion and a $U_{1-2}$-phase winding portion in series, the $V_1$-phase winding is configured by connecting a $V_{1-1}$-phase winding portion and a $V_{1-2}$-phase winding portion in series, the $W_1$-phase winding is configured by connecting a $W_{1-1}$-phase winding portion and a $W_{1-2}$-phase winding portion in series, the $U_2$-phase winding is configured by connecting a $U_{2-1}$-phase winding portion and a $U_{2-2}$-phase winding portion in series, the $V_2$-phase winding is configured by connecting a $V_{2-1}$-phase winding portion and a $V_{2-2}$-phase winding portion in series, and the $W_2$-phase winding is configured by connecting a $W_{2-1}$-phase winding portion and a $W_{2-2}$-phase winding portion in series. The $U_{1-1}$-phase winding portion and the $U_{2-1}$-phase winding portion are mounted into a first slot group that is constituted by the slots at intervals of six slots, the $U_{1-2}$-phase winding portion and the $U_{2-2}$-phase winding portion are mounted into a second slot group that is constituted by the slots at intervals of six slots and that is adjacent to the first slot group, the $V_{1-1}$-phase winding portion and the $V_{2-1}$-phase winding portion are mounted into a third slot group that is constituted by the slots at intervals of six slots, the $V_{1-2}$-phase winding portion and the $V_{2-2}$-phase winding portion are mounted into a fourth slot group that is constituted by the slots at intervals of six slots and that is adjacent to the third slot group, the $W_{1-1}$-phase winding portion and the $W_{2-1}$-phase winding portion are mounted into a fifth slot group that is constituted by the slots at intervals of six slots, and the $W_{1-2}$-phase winding portion and the $W_{2-2}$-phase winding portion are mounted into a sixth slot group that is constituted by the slots at intervals of six slots and that is adjacent to the fifth slot group. The $U_{1-1}$-phase winding portion, the $U_{2-2}$-phase winding portion, the $V_{1-1}$-phase winding portion, the $V_{2-2}$-phase winding portion, the $W_{1-1}$-phase winding portion, and the $W_{2-2}$-phase winding portion are configured by winding conductor wires that have an identical cross-sectional shape into respective wave windings in the slots at intervals of six slots for m turns (where m is an integer), and the $U_{1-2}$-phase winding portion, the $U_{2-1}$-phase winding portion, the $V_{1-2}$-phase winding portion, the $V_{2-1}$-phase winding portion, the $W_{1-2}$-phase winding portion, and the $W_{2-1}$-phase winding portion are configured by winding the conductor wires into respective wave windings in the slots at intervals of six slots for n turns (where n is an integer that is different than m). The first three-phase stator winding and the second three-phase stator winding are connected in parallel by connecting an output end of the $U_1$-phase winding and an output end of the $U_2$-phase winding, by connecting an output end of the $V_1$-phase winding and an output end of the $V_2$-phase winding, and by connecting an output end of the $W_1$-phase winding and an output end of the $W_2$-phase winding.

According to the present invention, the $U_{1-1}$-phase winding portion that constitutes the $U_1$-phase winding and the $U_{2-1}$-phase winding portion that constitutes the $U_2$-phase winding are wound into the first slot group, and the $U_{1-2}$-phase winding portion that constitutes the $U_1$-phase winding and the $U_{2-2}$-phase winding portion that constitutes the $U_2$-phase winding are wound into the second slot group. Thus, the number of conductor wires that are housed in each of the slots of the first slot group is (m+n), and the number of conductor wires that are housed in each of the slots of the second slot group is (m+n). Thus, the number of conductor wires that are housed in each of the slots is equal, suppressing formation of unevenness on inner circumferential surfaces of the coil end groups of the stator winding. Generation of wind-splitting noise that results from interference between the rotating rotor and the inner circumferential surfaces of the coil end groups is thereby suppressed.

DETAILED DESCRIPTION OF THE PREFERRED EMBODIMENTS

A preferred embodiment of the present invention will now be explained with reference to the drawings.

Figure 1:
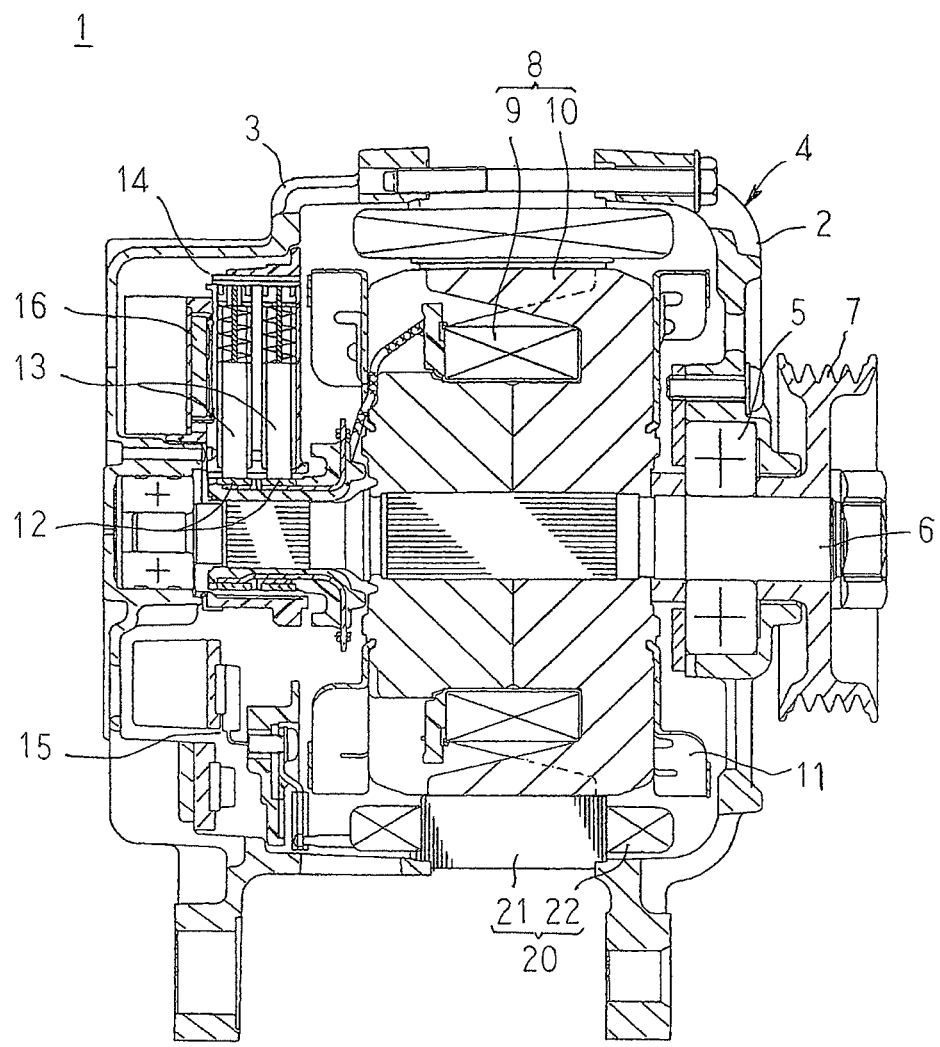
FIG. 1 is a longitudinal cross section that shows an automotive alternator according to a preferred embodiment of the present invention.
Figure 2:
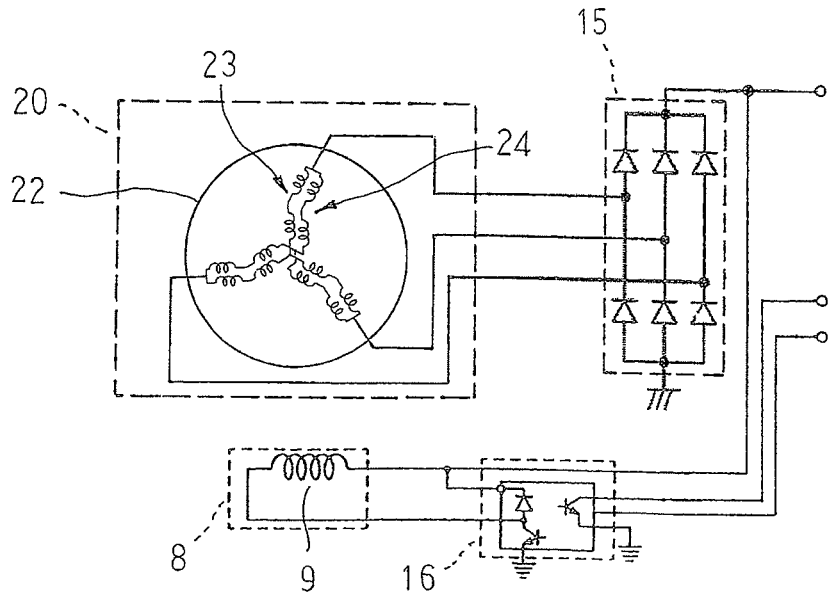
FIG. 2 is an electrical circuit diagram for the automotive alternator according to the preferred embodiment of the present invention.
Figure 3:
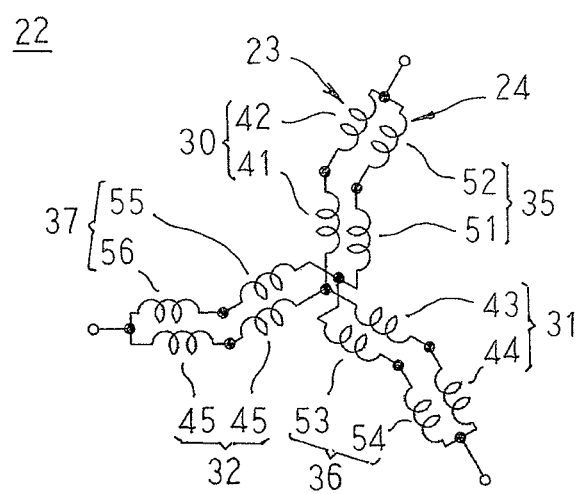
FIG. 3 is a connection diagram for a stator winding in the automotive alternator according to the preferred embodiment of the present invention.
Figure 4:
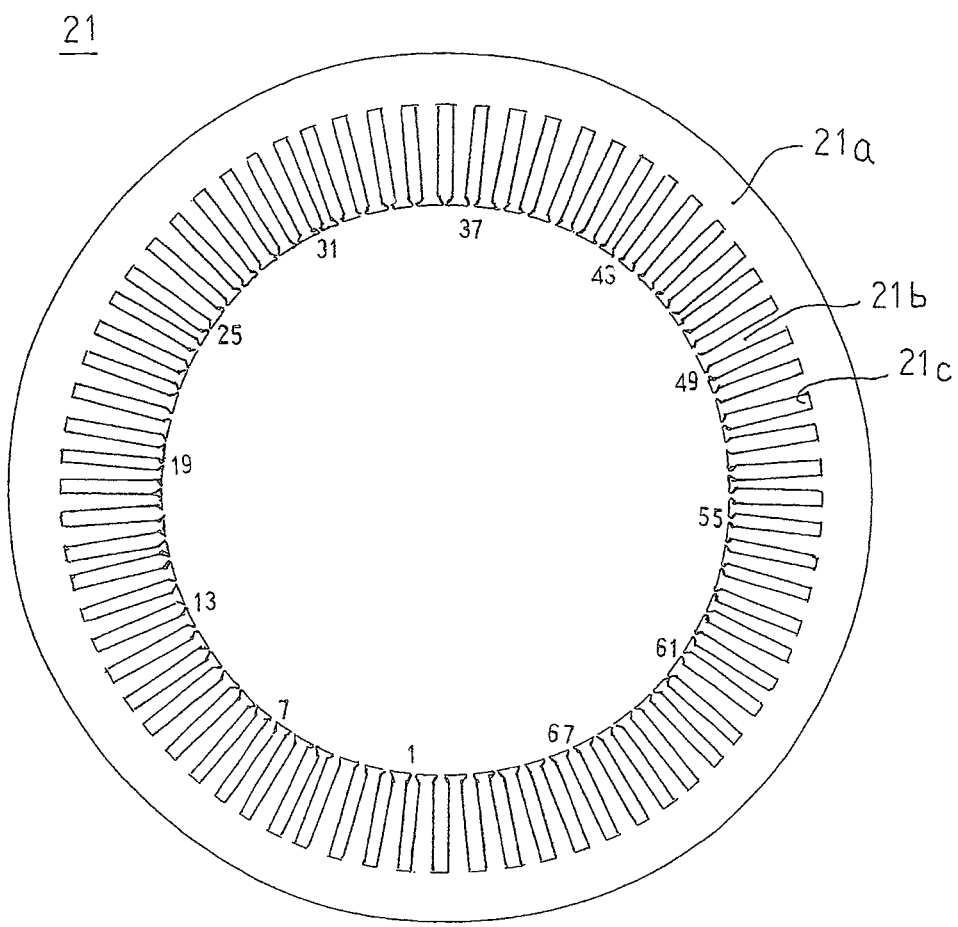
FIG. 4 is an end elevation that shows a stator core that is used in the automotive alternator according to the preferred embodiment of the present invention.
Figure 5:
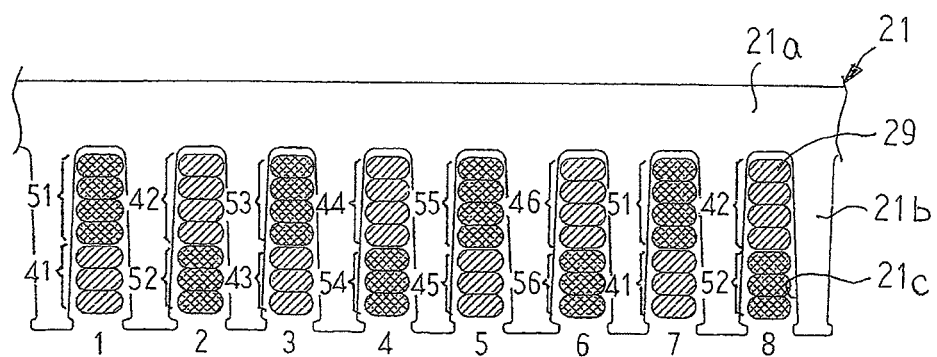
FIG. 5 is a partial end elevation that explains a state in which conductor wires are mounted into the stator core in the automotive alternator according to the preferred embodiment of the present invention.

FIG. 1 is a longitudinal cross section that shows an automotive alternator according to a preferred embodiment of the present invention, FIG. 2 is an electrical circuit diagram for the automotive alternator according to the preferred embodiment of the present invention, FIG. 3 is a connection diagram for a stator winding in the automotive alternator according to the preferred embodiment of the present invention, FIG. 4 is an end elevation that shows a stator core that is used in the automotive alternator according to the preferred embodiment of the present invention, and FIG. 5 is a partial end elevation that explains a state in which conductor wires are mounted into the stator core in the automotive alternator according to the preferred embodiment of the present invention. Moreover, 1, 7, etc., through 67 in FIG. 4 represent slot numbers. FIG. 5 represents a state in which an annular stator core is cut open and spread out in a plane.

In FIG. 1, an automotive alternator 1 that functions as a rotary electric machine includes: a housing 4 that is constituted by a front bracket 2 and a rear bracket 3 that are each approximately bowl-shaped and made of aluminum; a shaft 6 that is rotatably supported in the housing 4 by means of bearings 5; a pulley 7 that is fixed to an end portion of the shaft 6 that extends out frontward from the housing 4; a rotor 8 that is fixed to the shaft 6 and that is disposed inside the housing 4; a stator 20 that is fixed to the housing 4 so as to surround the rotor 8; a pair of slip rings 12 that are fixed to a rear end of the shaft 6, and that supply electric current to the rotor 8; a pair of brushes 13 that slide on respective surfaces of the slip rings 12; a brush holder 14 that accommodates the brushes 13; a rectifier 15 that is electrically connected to the stator 20 so as to convert alternating current that is generated by the stator 20 into direct current; and a voltage regulator 16 that is mounted onto the brush holder 14, and that adjusts magnitude of an alternating-current voltage that is generated by the stator 20.

The rotor 8 includes: a field coil 9 that generates magnetic flux on passage of an excitation current; a pole core 10 that is disposed so as to cover the field coil 9, and in which magnetic poles are formed by the magnetic flux; and the shaft 6, which is fitted centrally through the pole core 10. Fans 11 are fixed to two axial end surfaces of the pole core 10 by welding, etc.

The stator 20 is held from two axial ends by the front bracket 2 and the rear bracket 3, and includes: a stator core 21 that is disposed so as to surround the pole core 10 so as to ensure a uniform gap from an outer peripheral surface of the pole core 10 of the rotor 8; and the stator winding 22, which is mounted to the stator core 21.

As shown in FIG. 4, the stator core 21 is a laminated core that is formed into a cylindrical shape by laminating a predetermined number of core segments that are formed by punching thin magnetic steel plates into annular shapes, and integrating the laminated predetermined number of core segments by welding, for example. The stator core 21 has: an annular core back portion 21a; tooth portions 21b that each extend radially inward from an inner peripheral surface of the core back portion 21a, and that are arranged at a uniform angular pitch circumferentially; and slots 21c that are bounded by the core back portion 21a and adjacent tooth portions 21b.

Here, the number of claw-shaped magnetic poles in the pole core 10 of the rotor 8 is twelve, and the number of slots 21c is seventy-two. Specifically, the slots 21c are formed at a ratio of two slots per phase per pole, and at a uniform angular pitch circumferentially (an electrical pitch of π/6).

As shown in FIGS. 2 and 3, the stator winding 22 is configured by connecting together output ends of the three phases of the first three-phase stator winding 23 and the second three-phase stator winding 24 to connect the first three-phase stator winding 23 and the second three-phase stator winding 24 in parallel.

The first three-phase stator winding 23 is configured by wye-connecting a $U_1$-phase winding 30, a $V_1$-phase winding 31, and a $W_1$-phase winding 32. The $U_1$-phase winding 30 is configured by connecting in series a $U_{1-1}$-phase winding portion 41 and a $U_{1-2}$-phase winding portion 42 that have a phase difference of 30 electrical degrees. The $V_1$-phase winding 31 is configured by connecting in series a $V_{1-1}$-phase winding portion 43 and a $V_{1-2}$-phase winding portion 44 that have a phase difference of 30 electrical degrees. The $W_1$-phase winding 32 is configured by connecting in series a $W_{1-1}$-phase winding portion 45 and a $W_{1-2}$-phase winding portion 46 that have a phase difference of 30 electrical degrees.

The second three-phase stator winding 24 is configured by wye-connecting a $U_2$-phase winding 35, a $V_2$-phase winding 36, and a $W_2$-phase winding 37. The $U_2$-phase winding 35 is configured by connecting in series a $U_{2-1}$-phase winding portion 51 and a $U_{2-2}$-phase winding portion 52 that have a phase difference of 30 electrical degrees. The $V_2$-phase winding 36 is configured by connecting in series a $V_{2-1}$-phase winding portion 53 and a $V_{2-2}$-phase winding portion 54 that have a phase difference of 30 electrical degrees. The $W_2$-phase winding 37 is configured by connecting in series a $W_{2-1}$-phase winding portion 55 and a $W_{2-2}$-phase winding portion 56 that have a phase difference of 30 electrical degrees.

An output end of the $U_1$-phase winding 30 and an output end of the $U_2$-phase winding 35 are connected, an output end of the $V_1$-phase winding 31 and an output end of the $V_2$-phase winding 36 are connected, and an output end of the $W_1$-phase winding 32 and an output end of the $W_2$-phase winding 37 are connected. The first three-phase stator winding 23 and the second three-phase stator winding 24 are thereby connected in parallel to configure the stator winding 22.

Next, a specific construction of the stator winding 22 will be explained.

The $U_{1-1}$-phase winding portion 41 is a three-turn wave winding that is formed by winding a conductor wire 29 into a wave winding in a first slot group that is constituted by the slots 21c at intervals of six slots that include Slot Numbers 1, 7, etc., through 61, and 67. The $U_{1-2}$-phase winding portion 42 is a four-turn wave winding that is formed by winding a conductor wire 29 into a wave winding in a second slot group that is constituted by the slots 21c at intervals of six slots that include Slot Numbers 2, 8, etc., through 62, and 68.

The $V_{1-1}$-phase winding portion 43 is a three-turn wave winding that is formed by winding a conductor wire 29 into a wave winding in a third slot group that is constituted by the slots 21c at intervals of six slots that include Slot Numbers 3, 9, etc., through 63, and 69. The $V_{1-2}$-phase winding portion 44 is a four-turn wave winding that is formed by winding a conductor wire 29 into a wave winding in a fourth slot group that is constituted by the slots 21c at intervals of six slots that include Slot Numbers 4, 10, etc., through 64, and 70.

The $W_{1-1}$-phase winding portion 45 is a three-turn wave winding that is formed by winding a conductor wire 29 into a wave winding in a fifth slot group that is constituted by the slots 21c at intervals of six slots that include Slot Numbers 5, 11, etc., through 65, and 71. The $W_{1-2}$-phase winding portion 46 is a four-turn wave winding that is formed by winding a conductor wire 29 into a wave winding in a sixth slot group that is constituted by the slots 21c at intervals of six slots that include Slot Numbers 6, 12, etc., through 66, and 72.

The $U_{2-1}$-phase winding portion 51 is a four-turn wave winding that is formed by winding a conductor wire 29 into a wave winding in the first slot group. The $U_{2-2}$-phase winding portion 52 is a three-turn wave winding that is formed by winding a conductor wire 29 into a wave winding in the second slot group.

The $V_{2-1}$-phase winding portion 53 is a four-turn wave winding that is formed by winding a conductor wire 29 into a wave winding in the third slot group. The $V_{2-2}$-phase winding portion 54 is a three-turn wave winding that is formed by winding a conductor wire 29 into a wave winding in the fourth slot group.

The $W_{2-1}$-phase winding portion 55 is a four-turn wave winding that is formed by winding a conductor wire 29 into a wave winding in the fifth slot group. The $W_{2-2}$-phase winding portion 56 is a three-turn wave winding that is formed by winding a conductor wire 29 into a wave winding in the sixth slot group.

The $U_1$-phase winding 30 is configured by joining a winding finish portion of the $U_{1-1}$-phase winding portion 41 and a winding start portion of the $U_{1-2}$-phase winding portion 42 by tungsten-inert gas (TIG) welding, etc., and is a seven-turn winding. Similarly, the $V_1$-phase winding 31 and the $W_1$-phase winding 32 are also seven-turn wave windings.

Then, the winding start portions of the $U_{1-1}$-phase winding portion 41, the $V_{1-1}$-phase winding portion 43, and the $W_{1-1}$-phase winding portion 45 are joined by TIG welding, etc., to form the first three-phase stator winding 23.

The $U_2$-phase winding 35 is a seven-turn wave windings that is configured by connecting the $U_{2-1}$-phase winding portion 51 and the $U_{2-2}$-phase winding portion 52 in series. Similarly, the $V_2$-phase winding 36 and the $W_2$-phase winding 37 are also seven-turn wave windings. Then, the winding start portions of the $U_{2-1}$-phase winding portion 51, the $V_{2-1}$-phase winding portion 53, and the $W_{2-1}$-phase winding portion 55 are joined by TIG welding, etc., to form the second three-phase stator winding 24.

In addition, winding finish portions of the $U_{1-2}$-phase winding portion 42 and the $U_{2-2}$-phase winding portion 52 are joined by TIG welding, etc., winding finish portions of the $V_{1-2}$-phase winding portion 44 and the $V_{2-2}$-phase winding portion 54 are joined by TIG welding, etc., and winding finish portions of the $W_{1-2}$-phase winding portion 46 and the $W_{2-2}$-phase winding portion 56 are joined by TIG welding, etc., to form the stator winding 22.

Next, operation of the automotive alternator 1 that is configured in this manner will be explained.

First, an electric current is supplied from a battery (not shown) through the brushes 13 and the slip rings 12 to the field coil 9 of the rotor 8 to generate magnetic flux. Magnetic poles are formed in the claw-shaped magnetic poles of the pole core 10 by this magnetic flux.

At the same time, rotational torque from an engine is transferred to the shaft 6 by means of a belt (not shown) and the pulley 7 to rotate the rotor 8. Thus, rotating magnetic fields are applied to the stator winding 22 in the stator 20 to generate electromotive forces in the stator winding 22. The alternating currents that are generated by these electromotive forces are rectified into a direct current by the rectifier 15, to charge the battery, or be supplied to an electrical load.

In the stator winding 22 that is configured in this manner, the two winding portions of each of the phases that are connected in parallel all have seven turns, suppressing the generation of cyclic currents in the parallel circuit portions.

As shown in FIG. 5, seven conductor wires 29 are housed inside each of the slots 21c. Thus, the number of conductor wires 29 that are housed in each of the slots 21c is equal, suppressing the formation of unevenness on the inner circumferential surfaces of the coil end groups of the stator winding 22. Generation of wind-splitting noise that results from interference between the rotating rotor 8 and the inner circumferential surfaces of the coil end groups is thereby suppressed.

Because the neutral points between the first three-phase stator winding 23 and the second three-phase stator winding 24 are each configured by connecting three conductor wires 29, work for connecting together the neutral points between the first three-phase stator winding 23 and the second three-phase stator winding 24 is extremely complicated. In the present invention, because the neutral points between the first three-phase stator winding 23 and the second three-phase stator winding 24 are not connected with each other, the complicated connecting work can be omitted, facilitating manufacturing of the stator 20.

In the respective phase windings, because two winding portions that are offset by 30 electrical degrees, such as the $U_{1-1}$-phase winding portion 41 and the $U_{1-2}$-phase winding portion 42, for example, are connected in series, magnetomotive pulsating forces can be reduced, reducing magnetic noise.

In the respective phase windings, because the turn counts in the two winding portions that are connected in series, such as the $U_{1\text{-}1}$-phase winding portion 41 and the $U_{1\text{-}2}$-phase winding portion 42, for example, are different, output from the automotive alternator 1 can be increased.

Figure 6:
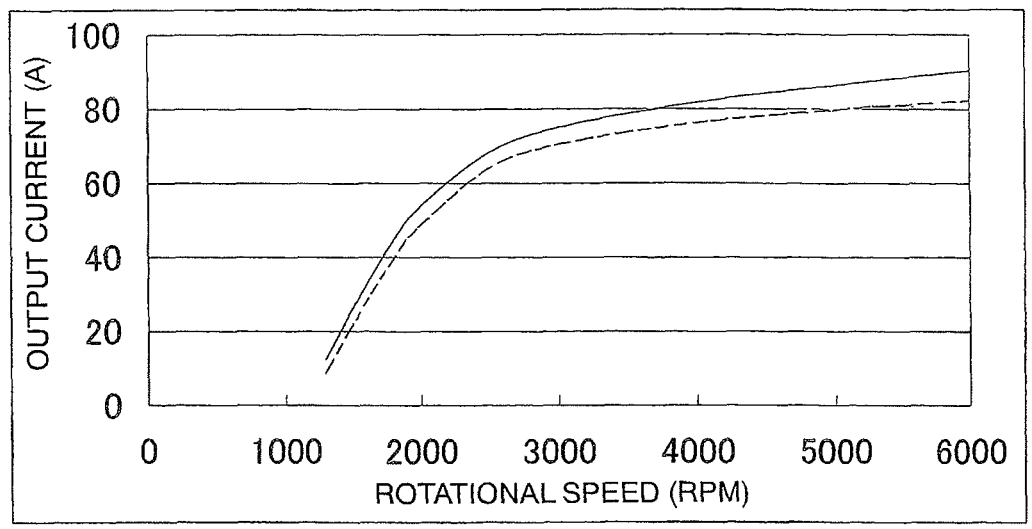
FIG. 6 is a graph that shows measured results of output characteristics of the automotive alternator according to the preferred embodiment of the present invention.
Figure 7:
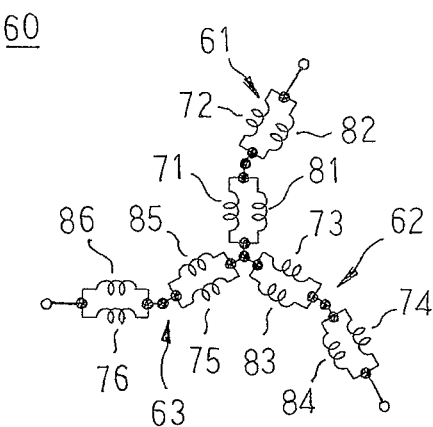
FIG. 7 is a connection diagram for a stator winding according to a comparative example.

Here, results when output characteristics of the present automotive alternator 1 were measured are shown in FIG. 6. Moreover, in FIG. 6, the solid line represents the output characteristics of the present automotive alternator 1, and the broken line represents the output characteristics of a comparative automotive alternator. The comparative automotive alternator is configured in a similar manner to that of the present automotive alternator 1 except that a comparative stator winding 60 that is shown in FIG. 7 is used.

As can be seen from FIG. 6, it has been confirmed that the automotive alternator 1 can achieve higher output than the comparative automotive alternator throughout a range of rotational speeds.

Figure 8:
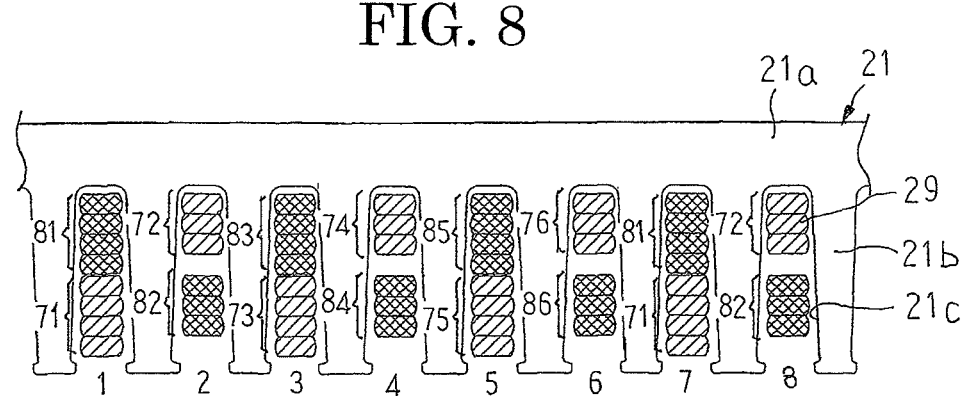
FIG. 8 is a partial end elevation that explains a state in which conductor wires are mounted into a stator core in an automotive alternator according to the comparative example.

Next, a specific construction of the comparative stator winding 60 will be explained with reference to FIGS. 7 and 8. Moreover, FIG. 7 is a connection diagram for a stator winding according to the comparative example, and FIG. 8 is a partial end elevation that explains a state in which conductor wires are mounted into a stator core in an automotive alternator according to the comparative example. Moreover, FIG. 8 represents a state in which an annular stator core is cut open and spread out in a plane.

A $U_{1\text{-}1}$-phase winding portion 71 is a four-turn wave winding that is formed by winding a conductor wire 29 into a wave winding in the first slot group. A $U_{1\text{-}2}$-phase winding portion 72 is a three-turn wave winding that is formed by winding a conductor wire 29 into a wave winding in the second slot group.

A $V_{1\text{-}1}$-phase winding portion 73 is a four-turn wave winding that is formed by winding a conductor wire 29 into a wave winding in the third slot group. A $V_{1\text{-}2}$-phase winding portion 74 is a three-turn wave winding that is formed by winding a conductor wire 29 into a wave winding in the fourth slot group.

A $W_{1\text{-}1}$-phase winding portion 75 is a four-turn wave winding that is formed by winding a conductor wire 29 into a wave winding in the fifth slot group. A $W_{1\text{-}2}$-phase winding portion 76 is a three-turn wave winding that is formed by winding a conductor wire 29 into a wave winding in the sixth slot group.

A $U_{2\text{-}1}$-phase winding portion 81 is a four-turn wave winding that is formed by winding a conductor wire 29 into a wave winding in the first slot group. A $U_{2\text{-}2}$-phase winding portion 82 is a three-turn wave winding that is formed by winding a conductor wire 29 into a wave winding in the second slot group.

A $V_{2\text{-}1}$-phase winding portion 83 is a four-turn wave winding that is formed by winding a conductor wire 29 into a wave winding in the third slot group. A $V_{2\text{-}2}$-phase winding portion 84 is a three-turn wave winding that is formed by winding a conductor wire 29 into a wave winding in the fourth slot group.

A $W_{2\text{-}1}$-phase winding portion 85 is a four-turn wave winding that is formed by winding a conductor wire 29 into a wave winding in the fifth slot group. A $W_{2\text{-}2}$-phase winding portion 86 is a three-turn wave winding that is formed by winding a conductor wire 29 into a wave winding in the sixth slot group.

A U-phase winding 61 is configured by connecting in series a winding portion in which the $U_{1\text{-}1}$-phase winding portion 71 and the $U_{2\text{-}1}$-phase winding portion 81 are connected in parallel and a winding portion in which the $U_{1\text{-}2}$-phase winding portion 72 and the $U_{2\text{-}2}$-phase winding portion 82 are connected in parallel. A V-phase winding 62 is configured by connecting in series a winding portion in which the $V_{1\text{-}1}$-phase winding portion 73 and the $V_{2\text{-}1}$-phase winding portion 83 are connected in parallel and a winding portion in which the $V_{1\text{-}2}$-phase winding portion 74 and the $V_{2\text{-}2}$-phase winding portion 84 are connected in parallel. A W-phase winding 63 is configured by connecting in series a winding portion in which the $W_{1\text{-}1}$-phase winding portion 75 and the $W_{2\text{-}1}$-phase winding portion 85 are connected in parallel and a winding portion in which the $W_{1\text{-}2}$-phase winding portion 76 and the $W_{2\text{-}2}$-phase winding portion 86 are connected in parallel.

As shown in FIG. 7, the stator winding 60 is configured by wye-connecting the U-phase winding 61, the V-phase winding 62, and the W-phase winding 63, and forms an electrical circuit that is approximately equivalent to that of the stator winding 22 described above.

The comparative automotive alternator is configured using the stator winding 60 instead of the stator winding 22. In the stator winding 60 that is configured in this manner, the turn counts of the two winding portions that constitute the respective parallel circuit portions are also equal, suppressing the generation of cyclic currents in the parallel circuit portions. Because two winding portions that are offset by 30 electrical degrees are connected in series in each of the phase windings, magnetomotive pulsating forces can be reduced, reducing magnetic noise.

However, in the automotive alternator according to the comparative example, slots 21*c* in which eight conductor wires 29 are housed and slots 21*c* in which six conductor wires 29 are housed are arranged alternately, as shown in FIG. 8. Thus, unevenness arises on the inner circumferential surface of the coil end groups of the stator winding 22, increasing wind-splitting noise that results from interference between the rotating rotor 8 and the inner circumferential surfaces of the coil end groups.

Moreover, in each of the above embodiments, explanations are given for automotive alternators, but the present invention is not limited to automotive alternators, and similar effects are also exhibited if the present invention is applied to automotive rotary electric machines such as automotive electric motors, automotive generator-motors, etc.

In the above embodiment, phase windings are configured by connecting in series two winding portions that have a phase difference of 30 electrical degrees, but the phase difference between the two winding portions that are connected in series is not limited to 30 (electrical) degrees.

In the above embodiment, respective phase windings of the first and second three-phase stator windings are configured by connecting a four-turn winding portion and a three-turn winding portion in series, but the turn counts of the two winding portions that are connected in series are not limited to four turns and three turns, provided that they are different than each other.

What is claimed is:

1. A rotary electric machine comprising:
a rotor that is rotatably supported by a housing; and
a stator comprising:
   a stator core in which slots are formed at a ratio of two slots per phase per pole; and
   a first three-phase stator winding and a second three-phase stator winding that are mounted into said stator core,
   said stator being supported by said housing so as to surround said rotor,
wherein:
said first three-phase stator winding is configured by wye-connecting a $U_1$-phase winding, a $V_1$-phase winding, and a $W_1$-phase winding;

said second three-phase stator winding is configured by wye-connecting a $U_2$-phase winding, a $V_2$-phase winding, and a $W_2$-phase winding;

said $U_1$-phase winding is configured by connecting a $U_{1-1}$-phase winding portion and a $U_{1-2}$-phase winding portion in series;

said $V_1$-phase winding is configured by connecting a $V_{1-1}$-phase winding portion and a $V_{1-2}$-phase winding portion in series;

said $W_1$-phase winding is configured by connecting a $W_{1-1}$-phase winding portion and a $W_{1-2}$-phase winding portion in series;

said $U_2$-phase winding is configured by connecting a $U_{2-1}$-phase winding portion and a $U_{2-2}$-phase winding portion in series;

said $V_2$-phase winding is configured by connecting a $V_{2-1}$-phase winding portion and a $V_{2-2}$-phase winding portion in series;

said $W_2$-phase winding is configured by connecting a $W_{2-1}$-phase winding portion and a $W_{2-2}$-phase winding portion in series;

said $U_{1-1}$-phase winding portion and said $U_{2-1}$-phase winding portion are mounted into a first slot group that is constituted by said slots at intervals of six slots;

said $U_{1-2}$-phase winding portion and said $U_{2-2}$-phase winding portion are mounted into a second slot group that is constituted by said slots at intervals of six slots and that is adjacent to said first slot group;

said $V_{1-1}$-phase winding portion and said $V_{2-1}$-phase winding portion are mounted into a third slot group that is constituted by said slots at intervals of six slots;

said $V_{1-2}$-phase winding portion and said $V_{2-2}$-phase winding portion are mounted into a fourth slot group that is constituted by said slots at intervals of six slots and that is adjacent to said third slot group;

said $W_{1-1}$-phase winding portion and said $W_{2-1}$-phase winding portion are mounted into a fifth slot group that is constituted by said slots at intervals of six slots;

said $W_{1-2}$-phase winding portion and said $W_{2-2}$-phase winding portion are mounted into a sixth slot group that is constituted by said slots at intervals of six slots and that is adjacent to said fifth slot group;

said $U_{1-1}$-phase winding portion, said $U_{2-2}$-phase winding portion, said $V_{1-1}$-phase winding portion, said $V_{2-2}$-phase winding portion, said $W_{1-1}$-phase winding portion, and said $W_{2-2}$-phase winding portion are configured by winding conductor wires that have an identical cross-sectional shape into respective wave windings in said slots at intervals of six slots for m turns (where m is an integer);

said $U_{1-2}$-phase winding portion, said $U_{2-1}$-phase winding portion, said $V_{1-2}$-phase winding portion, said $V_{2-1}$-phase winding portion, said $W_{1-2}$-phase winding portion, and said $W_{2-1}$-phase winding portion are configured by winding said conductor wires into respective wave windings in said slots at intervals of six slots for n turns (where n is an integer that is different than m); and said first three-phase stator winding and said second three-phase stator winding are connected in parallel by connecting an output end of said $U_1$-phase winding and an output end of said $U_2$-phase winding, by connecting an output end of said $V_1$-phase winding and an output end of said $V_2$-phase winding, and by connecting an output end of said $W_1$-phase winding and an output end of said $W_2$-phase winding.

2. A rotary electric machine according to claim 1, wherein a neutral point of said first three-phase stator winding and a neutral point of said second three-phase stator winding are not connected.

* * * * *